United States Patent
Markham et al.

(10) Patent No.: US 6,215,119 B1
(45) Date of Patent: Apr. 10, 2001

(54) DUAL SENSOR ENCODER TO COUNTER ECCENTRICITY ERRORS

(75) Inventors: Roger Guy Markham, Webster; Anthony Edward Audi, Rochester; Kristin Anne Hughes, Webster, all of NY (US)

(73) Assignee: Xerox Corporation, Stamford, CA (US)

( * ) Notice: Subject to any disclaimer, the term of this patent is extended or adjusted under 35 U.S.C. 154(b) by 0 days.

(21) Appl. No.: 09/232,818

(22) Filed: Jan. 19, 1999

(51) Int. Cl.[7] .................................................. G01D 5/347
(52) U.S. Cl. ........................................ 250/231.14; 341/13
(58) Field of Search ........................ 250/231.13, 231.14, 250/231.15, 231.16, 231.17, 231.18; 341/11, 13

(56) References Cited

U.S. PATENT DOCUMENTS

| | | | |
|---|---|---|---|
| 4,928,009 | * 5/1990 | Ikebe et al. | 250/231.13 |
| 4,990,767 | * 2/1991 | Ernst et al. | 250/231.16 |
| 5,138,564 | 8/1992 | deJong et al. | |
| 5,150,115 | 9/1992 | deJong et al. | |
| 5,774,074 | * 6/1998 | Cooper et al. | 341/11 |

FOREIGN PATENT DOCUMENTS 0 665 116 * 8/1995 (EP) .

OTHER PUBLICATIONS

HP Technical Data, "Three Channel Optical Incremental Encoder Modules," 5965–5870E, pp. 2–52–2–62.
HP Technical Data, "Two and Three Channel Codewheels for use with HP Optical Encoder Modules," 5965–6891E, pp. 2–127–2–138.

* cited by examiner

Primary Examiner—F. L. Evans
(74) Attorney, Agent, or Firm—Oliff & Berridge, PLC (57) ABSTRACT

A low-cost, high precision encoder system includes a codewheel and two encoder sensors mounted at opposite sides of the codewheel to form a dual sensor system having a corrected output that corrects for eccentricity in the mounting of the codewheel and the sensors. The encoder system has a correction circuit that provides a corrected output based on inputs received from the two encoder sensors, which can be single or multiple channel encoders. Methods for achieving the corrected output signal include measuring a time between a signal from the first encoder and a signal from the second encoder and halving this time. Methods for identifying a leading signal from the two sensors are also provided.

21 Claims, 10 Drawing Sheets

DUAL SENSOR ENCODER TO COUNTER ECCENTRICITY ERRORS

BACKGROUND OF THE INVENTION

1. Field of Invention

The invention relates to a dual sensor encoder system that compensates for eccentricity errors that may be introduced during mounting. The dual sensor encoder system may be used to control positioning of a printing drum architecture.

2. Description of Related Art

Printing drum architectures require precise rotational alignment signaling to accurately align and time paper transport and image generation. This is particularly true for multiple head printing systems.

It was previously considered that low-cost encoders could not be used for systems requiring extremely high precision. Instead, if high precision was needed, more precise (and expensive) encoders had to be used. A particularly accurate known encoder is a Teledyne-Gurley encoder. However, such an encoder costs approximately $1000. In one particular drum architecture, it is desirable to have an encoder runout of about 0.5 mRad. However, conventional low-cost encoders typically have a runout error of about 3.0 mRad. As such, one would not expect that a low-cost encoder could work with an architecture having such high accuracy requirements. While a Teledyne-Gurley encoder would be suitable for such an application, it greatly increases the cost of the architecture.

SUMMARY OF THE INVENTION

The worst error from conventional low-cost wheel encoders is believed to be due to eccentric mounting of the codewheel. Thus, to ensure better accuracy, centering tolerances are believed to be critical. However, processes to carefully control the accuracy of codewheel placement on a drum architecture are time consuming, and thus add to the production costs of such drum architectures.

There is a need for a low-cost alternative that can achieve similar precision in accurately determining the location of the drum without the expense of a high cost encoder or extensive time and equipment to control the mounting eccentricity of a low-cost encoder.

One exemplary embodiment of the dual sensor encoder systems and methods of this invention overcome these problems by including two low-cost, lower precision wheel encoders sensors, a first encoder sensor and a second encoder sensor, that are mounted in a certain way on a codewheel to offset eccentric mounting errors. In particular, two low-cost readout sensors can be mounted at opposite sides of the encoder wheel, i.e., 180° apart, to form a dual sensor encoder system. With this arrangement, the effect of any eccentric mounting is calculated to be zero if the angle is taken to be the average of the sensor readings.

One exemplary embodiment of the systems and methods of this invention digitally synthesizes a signal that is phase locked half way in time between the two sensor signals to provide a correction signal. The method counts the time from the first encoder to the second encoder and uses half of the counted time as the next encoder pulse delay from the first encoder. When a leading edge of a pulse of the first encoder rises, an up-counter is cleared and both the up-counter and a down-counter begin to run. When the down-counter reaches zero, the colTected encoder pulse is formed. When the leading edge of a pulse of the second encoder finally rises, the elapsed time difference, as measured by the up-counter, is cut in half and the halved value from the up-counter is pre-loaded into the down-counter. Thus, the down-counter counts off half the previous elapsed time difference.

The up-counter always runs, as it is cleared by the leading edge of the pulse from the first encoder and captured by the leading edge of the pulse from the second encoder. The down-counter, however, only runs in the interval from the leading edge of the pulse from the first encoder until the down-counter reaches zero, which is roughly half of the time to the leading edge of the pulse from the second encoder. This is accomplished by having the next clock pulse after the down-counter reaches zero cause the down-counter to roll over to a maximum value and then disabling the down-counter awaiting reload.

By using this exemplary embodiment of the systems and methods of this invention, a corrected encoder sensor output signal having higher accuracy than that achieved using a single sensor encoder system is obtained.

A second exemplary embodiment of the systems and method of this invention uses the same codewheel and dual sensor encoder system. However, in the first exemplary embodiment, the rising edge of the second encoder sensor will occur after the rising edge of the pulse of the first encoder sensor and before the rising edge of the next first encoder sensor. That is, the rising edge of the pulse from the first encoder sensor will always lead the rising edge of the pulse from the second encoder sensor. However, this assumption may not always be correct if the alignment is substantially off. The second exemplary embodiment of the systems and methods of the invention resolves this problem.

Taking into consideration that the first and second encoder sensor signals can cross each other and assuming that a pair of pulses from the pair of encoder sensors will pass before the next pulse from either encoder sensor will arrive, the second exemplary embodiment of the systems and methods of this invention generates a corrected encoder pulse as follows: the time is counted from the first encoder pulse in the pair to the second encoder pulse in the pair, where the first encoder pulse is that which comes first from the first encoder sensor or the second encoder sensor. Half of this counted time is then used as the next corrected encoder pulse delay from the next encoder pulse that comes in, which can be generated by either the first encoder sensor or the second encoder sensor. This next encoder pulse that comes in is considered the leading signal for the next pair of pulses from the first encoder sensor and the second encoder sensor.

These and other features and advantages of this invention are described in or are apparent from the following detailed description of the exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
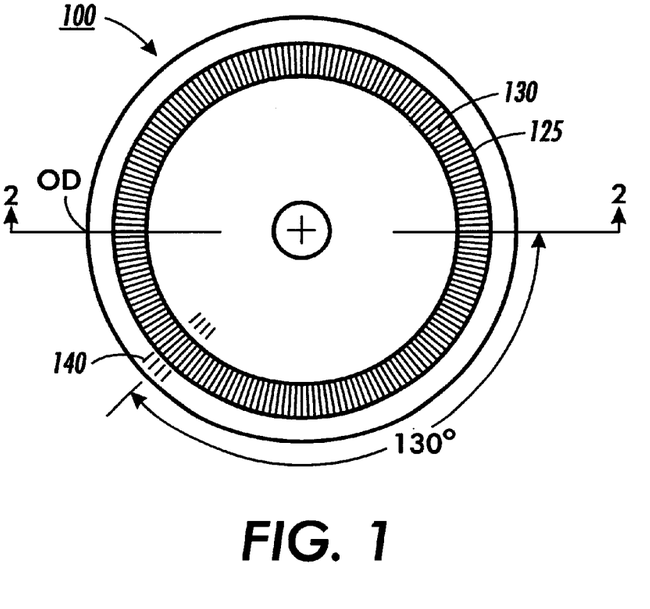
FIG. 1 is an end view of a codewheel according to the invention.
Figure 2:
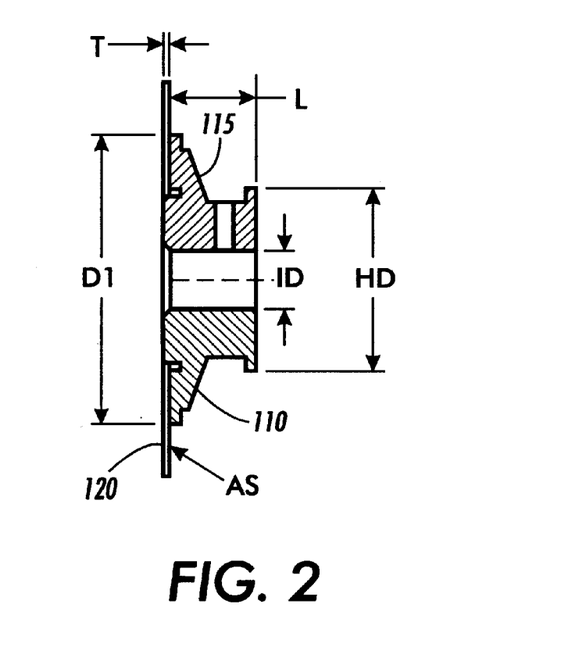
FIG. 2 is a cross-sectional view of the codewheel of FIG. 1 taken along line 2—2.

FIGS. 1 and 2 show an end view and a cross-sectional view, respectively, of an encoder wheel 100, such as a Hewlett-Packard HEDS-6140 codewheel that is available in glass, film or metal, depending on the particular application. One exemplary codewheel 100 is metal with an 8 mm shaft, 1024 counts/revolution, and an optical radius of 23.36 mm, such as the Hewlett Packard codewheel HEDS-6140-J13. In particular, the codewheel 100 includes a hub member 110, a set screw orifice 115, a disc-shaped wheel member 120, a plurality of alternating spaces 125 and bars 130 spaced around the disc-shaped wheel member 120, and an index pulse position 140. The disc-shaped wheel member 120 has a thickness T of 0.18 mm, an outer diameter OD of 50.48 mm, and a bar diameter D1 of 36.5 mm. The hub 110 has an inner diameter ID of 8 mm sized to receive a shaft, an outer diameter HD of 22.50 mm, and a length of 8.43 mm. For this particular model, an artwork side of the codewheel is AS. However, the systems and methods of the invention can be implemented using any suitable known or later developed capacitive, inductive or optical encoder wheel.

Figure 3:
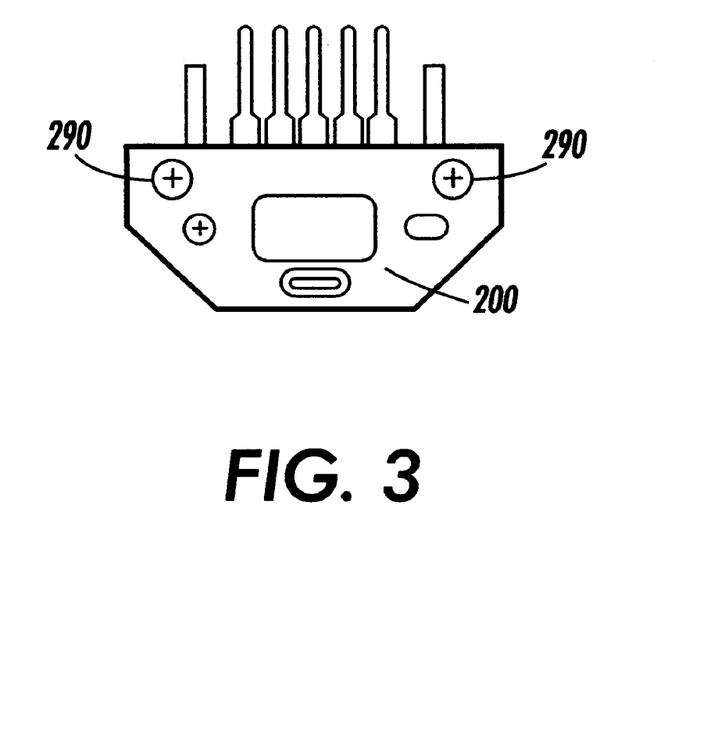
FIG. 3 is a top view of an optical encoder sensor according to the invention.
Figure 4:
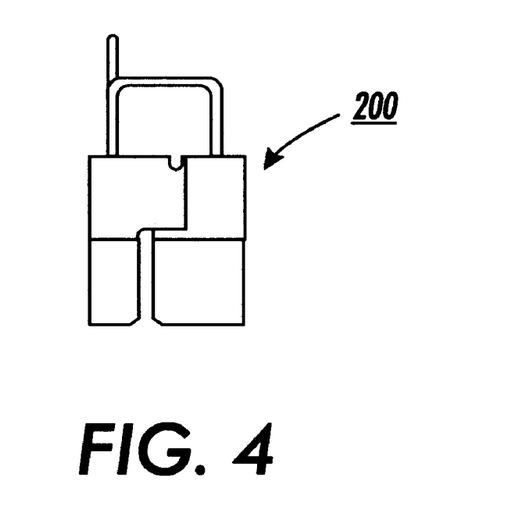
FIG. 4 is a side view of the encoder sensor of FIG. 3.

FIGS. 3 and 4 show an encoder sensor 200 usable with the codewheel 100, such as a Hewlett Packard HEDS-9040-J00 encoder sensor, which is a three-channel optical incremental encoder sensor. The encoder sensor 200 includes two aligning recesses 290 for mounting the encoder sensor 200. As better shown in FIGS. 4 and 5, the encoder sensor 200 includes a notched area for receiving the codewheel 100. However, the systems and methods of this invention can be implemented using any suitable known or later developed capacitive, inductive or optical encoder sensor or read head.

Figure 5:
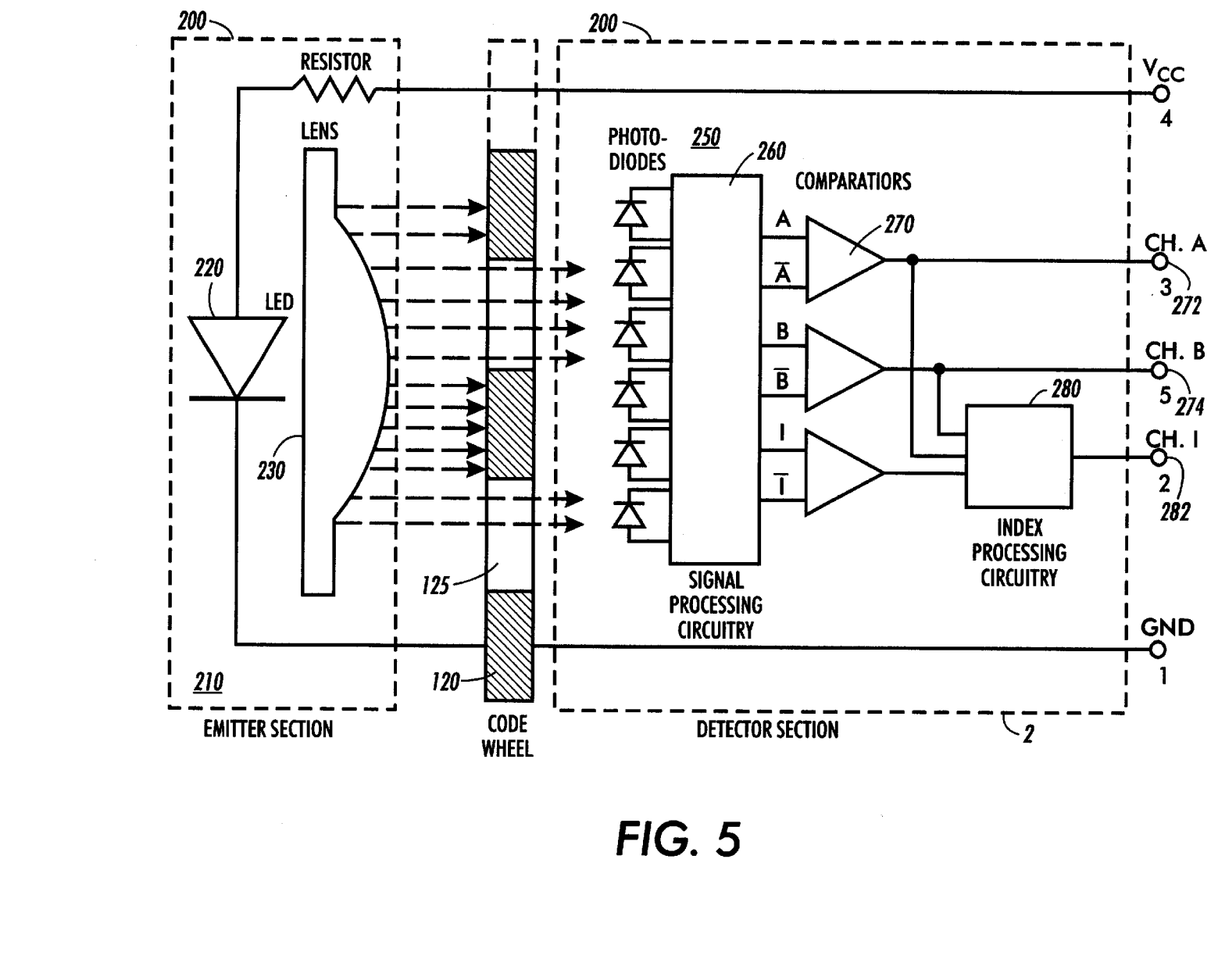
FIG. 5 is a block diagram of the codewheel and encoder sensor of FIGS. 1–4 in position to form an encoder system.

In the block diagram shown in FIG. 5, the encoder sensor 200 is shown broken down into an emitter section 210 and a detector section 240 encased within a small plastic package. The emitter section 210 includes a light source 220 and a lens 230. The detector section 240 includes an integrated circuit having one or more photodiodes 250, signal processing circuitry 260, comparators 270 and index processing circuitry 280. The encoder sensor 200 has sensor outputs 272 and 274 that are in quadrature plus an index output 282.

The index output 282 is a 90 electrical degree high true index pulse that is generated once for each full rotation of the associated codewheel 100.

The emitter section 210 collates the light output from the light source 220 into a parallel beam using the single polycarbonate lens 230 located directly over the light source 220. The integrated detector section 240 is positioned opposite the emitter section 210. The codewheel 100 rotates between the emitter section 210 and detector section 240, causing the light beam to be interrupted by the pattern of spaces 125 and bars 130 provided on the codewheel 100. The photodiodes 250 that detect these interruptions are arranged in a pattern that corresponds to the radius and design of the codewheel 100. These detectors 250 are also spaced such that a light period on one pair of detectors corresponds to a dark period on the adjacent pair of detectors. The signal output from the photodiodes 250 are then fed through the signal processing circuitry 260, resulting in signals a, a', b, b', i and i'. The comparators 270 receive these signals and produce quadrature outputs on the sensor outputs 272 and 274. Due to the integrated phase technique of the encoder sensor 200, the digital output of the sensor output 272 phase of the signal a on the sensor output 272 is in quadrature with the sensors output 274, i.e., 90° out of phase with the signal b on the sensor output 274. The output of the comparator 270 for the signals i and i' is input by the index processing circuitry 280, along with the signals a and b. The final signal i on the index output 282 is an index pulse that is generated once for each full rotation of the codewheel. That is, the signal i on the index output 282 is a one-state-width, high-true index pulse that is coincident with the low states of the signals a and b.

Figure 6:
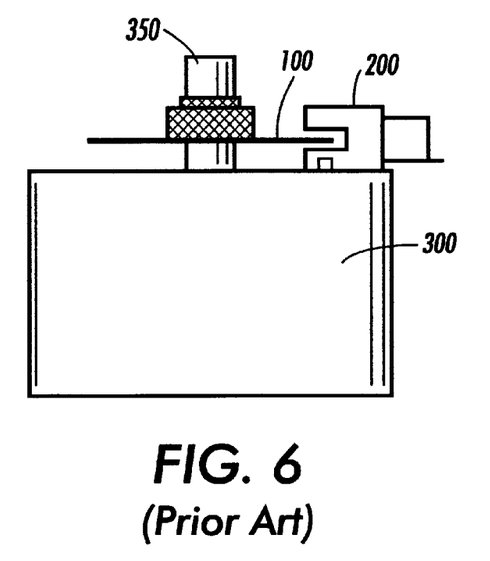
FIG. 6 is a side view of the codewheel and one encoder sensor of FIG. 5 mounted conventionally on a motor.

As shown in FIG. 6, the above-described conventional emitter/transmitter encoder sensor 200 is conventionally mounted on a motor 300 or some other known or later developed rotational element, along with the codewheel 100, which is mounted on a shaft 350 of the motor 300. The encoder sensor 200 detects the rotation of the rotational member, such as the shaft 350 due to the rotation of the codewheel 100. This allows for an adequate low-cost encoder for some applications, such as printer architectures. However, it has several problems that make it unsuitable for many high-resolution or high-accuracy applications. One of its main problems is its sensitivity to mounting errors. The worst error of the encoder sensor/codewheel combination is believed to be due to eccentric mounting of the codewheel 100 on the shaft 350. Thus, to ensure better accuracy, centering tolerances were once believed to be highly critical to minimize error. However, conventional processes to carefully control the accuracy of codewheel placement with respect to the shaft 350 are time consuming and thus, add to the production costs of such applications.

In a particular desired drum architecture, the encoder runout needs to be about 0.5 mRad. However, conventional low-cost encoder systems, such as the HP encoder sensor, codewheel combination shown in FIG. 6, typically have a runout error of about 3.0 mRad.

Figure 7:
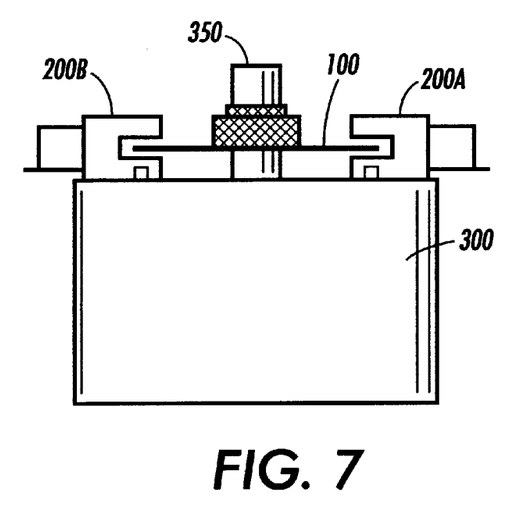
FIG. 7 is a side view of the codewheel and two encoder sensors of FIG. 5 mounted in a dual encoder sensor configuration on a motor according to the invention.

While one would not readily expect that such a low-cost encoder could be made to work for such an application, it has been discovered that a dramatic increase in accuracy and reduction of error can be achieved by the inventive dual sensor encoder arrangement shown in FIG. 7. As shown in FIG. 7, a first encoder sensor 200A and a second encoder sensor 200B are mounted at opposite sides of the codewheel 100. That is, they are mounted 180° apart along the codewheel. The encoder sensors 200A and 200B can be identical, such as a pair of the Hewlett-Packard HEDS-9040 encoder sensors. However, the same results are believed to be achievable using only single channel encoder sensor as a correction encoder and a single channel with index encoder sensor as a primary encoder.

Figure 8:
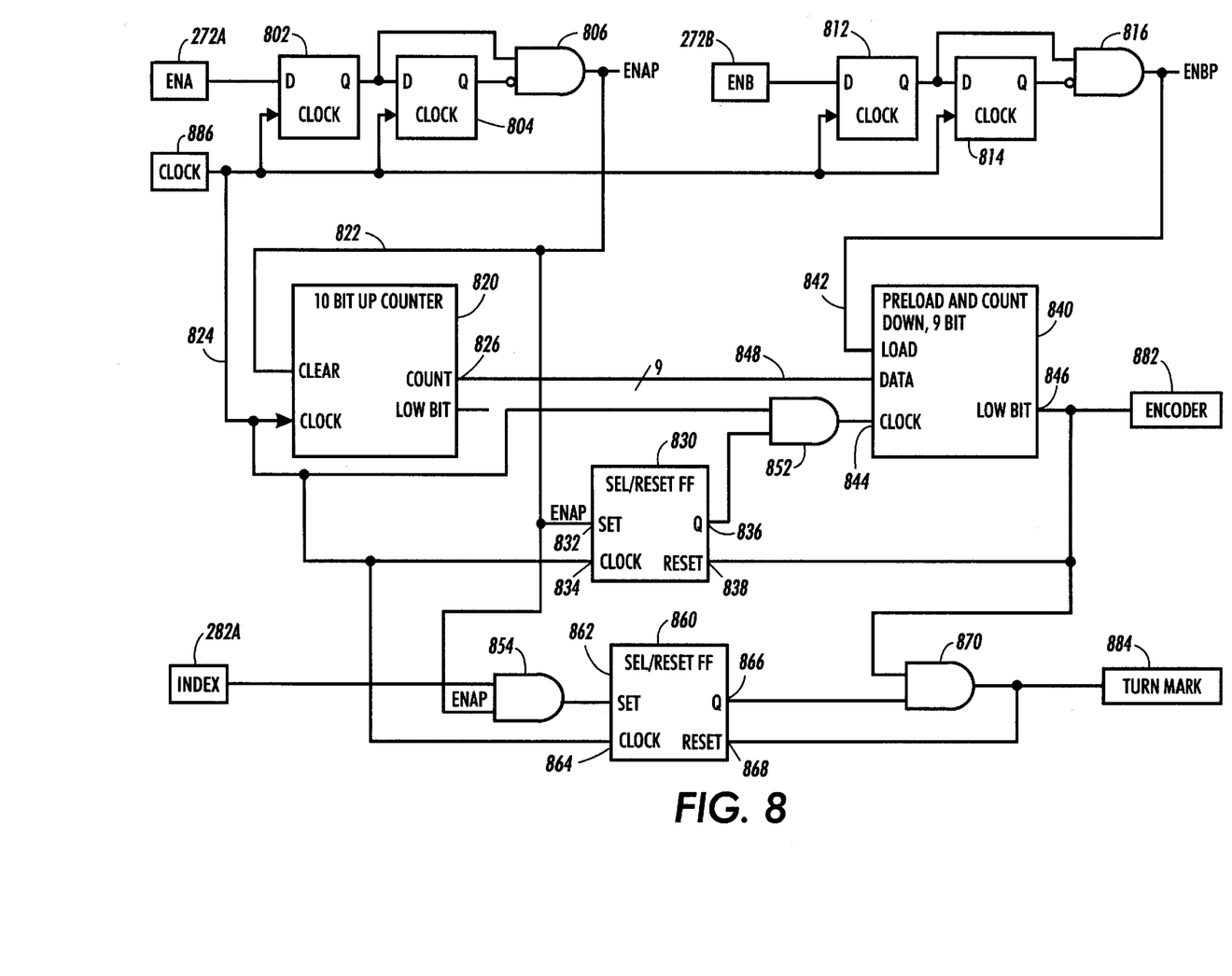
FIG. 8 is a circuit diagram for generating a modified signal according to a first exemplary embodiment of the invention.

FIG. 8 shows a block diagram of one exemplary embodiment of a circuit 800 that generates a low-error signal for the signals generated by the first and second sensors 200A and 200B. The circuit 800 digitally synthesizes a signal that is phase locked half way in time between the two sensor signals from the first and second encoder sensors 200A and 200B. The circuit 800 uses synchronous logic. With this arrangement, the effect of any eccentric mounting is calculated to be zero if the angle is taken to be the average of the sensor readings.

The circuit 800 receives inputs from the sensor output 272A of the encoder sensor 200A, the sensor output 272B of the encoder sensor 200B, and the index pulse output 282A from the encoder sensor 200A. When used to measure rotation of a printing drum architecture, the resolution of the drim architecture will dictate the desired resolution. An exemplary drum architecture prints with a scanline of about 41.6 microns. The preferred encoder sensors 200A and 200B, along with the codewheel 100, will generate 1024 counts per revolution. This will generate about one pulse for every nine scanlines. It is desired to have continuity to about 1/32nd of a scanline (1.3 microns). At a pixel rate of 12 kHz, a logic clock rate should be about 768 kHz. A logic circuit, rather than a microprocessor, is often needed at these speeds. However, for applications with lesser demands, a microprocessor may be used.

The circuit 800 of FIG. 8 includes D-type flip-flops 802, 804, 812 and 814, a 10-bit up-counter 820, a 9-bit down counter 840, set/reset flip-flops 830 and 860, clock signal 886, and AND gates 806, 816, 852, 854 and 870.

The D-type flip-flop 802 receives the sensor output 272A as an input, as well as the clock signal 886. At time $T_0$, both the flip-flops 802, 804 are initialized at zero (low). At time $T_1$, (first clock cycle), the output 272A is received at D. Upon the rising edge of the next clock cycle (time $T_2$) from the clock signal 886, the value of input D (Low or High) is output to the D input of the flip-flop 804 and one input of the AND gate 806. At the next clock cycle (time $T_3$), the input D from the flip-flop 804 is output to the other input of the AND gate 806, which is inverted. Due to the inverted input of the AND gate 806, when the value of the flip-flop 802 is high and the value of the flip-flop 804 is low, then the AND gate 806 outputs the ENAP signal. The ENAP signal is one clock cycle wide and represents the leading edge of the pulse generated by the encoder sensor 200A, and is fed to the clear input 822 of the up-counter 820, the set input 832 of the set/reset flip-flop 830, and one input of the AND gate 854.

The D-type flip-flops 812 and 814 and the AND gate 816 operate similar to the D-type flip-flops 802 and 804 and the AND gate 806 described above. At time $T_1$ (first clock cycle), the output 272B from the sensor 200B is received at the D input of the D-type flip-flop 812. Upon the rising edge of the next clock cycle (time $T_2$) from the clock signal 886, the value (Low or High) on the D input is output to the D input of the D-type flip-flop 814 and one input of the AND gate 816. At the next clock cycle (time $T_3$), the value on the D input of the D-type flip-flop 814 is output to the other input of the AND gate 816, which is inverted. Due to the inverted input of the AND gate 816, when the output of the D-type flip-flop 812 is high and the output of the D-type flip-flop 814 is low, then the AND gate 816 outputs the ENBP signal. The ENBP signal is one clock cycle wide and indicates the leading edge of the pulse generated by the encoder sensor 200B, and is fed to the load input 842 of the down-counter 840.

The up-counter 820 is cleared (10 bit low state) by the ENAP signal, which is connected to the CLEAR input 822. The down-counter 840 is initially set to a maximum value (9 bit high). The up-counter 820 receives clock cycle pulses from the clock signal 886 at a clock input 824. Once the CLEAR input 822 drops back to low, the up-counter begins to run to accumulate a count value based on the clock signal 886. The up-counter 820 is cleared each time a rising edge of the pulse generated by the encoder sensor 200A is detected. When the rising edge of the pulse generated by the encoder sensor 200B is detected, the ENBP signal is passed from the AND gate 816 to the LOAD input 842 of the down-counter 840. The ENBP signal loads the upper 9 bits of the current 10 bit value of the up-counter 820 from COUNT output 826 of the up-counter 820 to DATA input 848 of the down-counter 840. As only the upper 9 bits of the up-counter 820 are received, this value is approximately half the value counted by the up-counter 820. That is, for example, if the count is an even number such as 16, the value loaded into the down-counter 840 would be 8, and if the count is an odd number such as 9, the value loaded into the down-counter 840 would be 4.

The down-counter 840 receives a clock signal based on the state of set/reset flip-flops 830. The synchronous set/reset flip-flop 830 is initially in the reset state. Upon receiving the ENAP signal, the set/reset flip-flop 830 is placed in the set state on the next clock signal 886 and outputs a high signal to one input of AND gate 852 upon the arrival of the next clock signal 886. Thus, the AND gate 852 passes this next clock signal 886 to the CLOCK input 844 of the down-counter 840, and the down-counter 840 begins decrementing. Thus, after loading of the halved value of the up-counter 820 into the down-counter 840, the down-counter starts to run when a subsequent rising of the sensor 200A (ENAP). The down-counter 840 continues to run down to a count value of zero. While the count is zero, the ZERO output 846 outputs a high signal, which is the phase-locked encoder pulse 882. The ZERO output 846 of the down-counter 840 is also input by the RESET input 838 of the synchronous set/reset flip-flop 830 and by one input of the AND gate 870. The high signal from the ZERO output 846 places the set/reset flip-flop 830 in the reset state when the next clock signal 886 arrives. Thus, the set/reset flip-flop 830 outputs a low signal to the other input of the AND gate 852. Thus, the AND gate 852 isolates the down-counter 840 from the clock signal 886 but not until one more clock signal 886 has reached the down-counter 840 to cause it to reset to a maximum value and remove the ZERO signal. Thus, the down-counter 840 holds at the maximum value high awaiting another triggering of a rising edge of the pulse generated by the encoder sensor 200A.

The signal ENAP generated from the rising edge of the pulse generated by the encoder sensor 200A is also input to one input of the AND gate 854. The other input of the AND gate 854 is connected to the index pulse signal 282A of the first encoder sensor 200A. The synchronous set/reset flip-flop 860 inputs the clock signal 886 at CLOCK input 864. Initially, the set/reset flip-flop 860 is in the reset state, such that the set/reset flip-flop 860 outputs a low signal to an input of the AND gate 870. When both the index pulse signal 282A is high and the ENAP signal is high, the AND gate 854 outputs a high signal to SET input 862. This places the set/reset flip-flop 860 into the set state when the next clock signal 886 arrives. The set/reset flip-flop 860 thus outputs a high signal to one input of the AND gate 870. When the down-counter 840 counts down to zero, which will take half the elapsed time difference between the first and second sensors 200A and 200B, the ZERO output 846 of the down-counter 840 outputs a high signal to the other input of the AND gate 870. This causes the output of the AND gate 870 to go high. The output signal from the AND gate 870 is output as the turn mark 884. Thus, the index pulse is revised based on the elapsed time difference between the first and second encoder sensors 200A and 200B. The output from the AND gate 870 is also connected to the RESET input of the set/reset flip-flop 860. The high signal generated by the AND gate 870 places the set/reset flip-flop 860 in the reset state when the next clock signal 886 arrives.

The circuit of FIG. 8 counts the time from the pulse signal generated by the first encoder sensor 200A to the pulse signal generated by the encoder sensor 200B. Half of this count is then used to time the next encoder pulse delay after the pulse generated by the first encoder sensor 200A. When the first encoder sensor 200A rises, the up-counter 820 is cleared and both the up-counter 820 and the down-counter 840 run. When the down-counter 840 reaches zero, the encoder pulse 882 is formed. When the pulse generated by the second encoder sensor 200B finally rises, the elapsed time counted by the up-counter 820 is cut in half and pre-loaded into the down-counter 840. Thus, the down counter 840 counts off half the previous elapsed time difference.

The up-counter 820 always runs as it is cleared by the rising edge of the pulse generated by the first encoder sensor 200A and captured by the rising edge of the pulse generated by the second encoder sensor 200B. The down-counter 840, however, only runs in the interval from the rising edge of the pulse generated by the first encoder sensor 200A until the down-counter 840 counts down to zero, which is roughly half of the time until the leading edge of the pulse generated by the second encoder sensor 200B. This is accomplished by having the next clock signal after the down-counter 840 reaches zero cause the down-counter 840 to roll over and hold await being reloaded.

In this exemplary embodiment of the systems and method of this invention, the encoder sensors and rotation center of the codewheel 100 need to be aligned sufficiently well so that the chosen phase signal from the encoder sensor 200B stays phase locked within a chosen period of the chosen phase signal of the encoder sensor 200A during a full rotation of the drum architecture. If half of a phase period can be devoted to encoder alignment, the rotation center must be within about 17 microns of a straight line between the two encoder sensors. The encoder eccentricity plus offset of the rotation center from the line between the encoder sensors must not exceed 35 microns.

However, rather than mount the encoder sensors 200A and 200B accurately, which could incur cost, it is possible to place them approximately and then pick the correct phases to use from the two available phases at each encoder sensor. There are a few ways to do this. One way is to choose the "a" phase from the encoder sensor 200A ($\phi A_a$) and the best choice between the phase signals $\phi B_a, \phi B_b, !\phi B_a$, and $!\phi B_b$ of the encoder sensor 200B, where ! indicates the phase signal is inverted. By making the best choice from the phase signals, only 25% of the compensation range is used up regardless of how the encoder sensors 200A and 200B are mounted. This means that the encoder wheel can be mounted up to 26 microns off the center of rotation (eccentricity).

Selection of the "best" phase signal is achieved by determining the phase signal that has the least temporal overlap with the chosen phase signal from the first encoder sensor 200A. If a microprocessor randomly samples the chosen phase signal from the first encoder sensor 200A and each of the phase signals from the second encoder sensor 200B during a full turn of the drum, it can determine the phase signal from the second encoder sensor 200B that was least coincident with the chosen phase of the first encoder sensor 200A.

A simple program in C programming code to achieve this is:

```
while(oneturn) {
    if(phaseAa) {
        if(phaseBa) NBa ++; else NnotBa ++
        if(phaseBb) NBb ++; else NnotBb ++
    }
}
```

The smallest of the counters NBa, NnotBa, NBb and NnotBb indicates the correct choice of the phase signals from the second encoder sensor 200B to use. This choice should remain valid for much, if not all, of the life of the machine. Once the correct phase is known, the microprocessor can write routing signals to a data selector that passes the correct signal to the ENBP output shown in FIG. 8.

Figure 9:
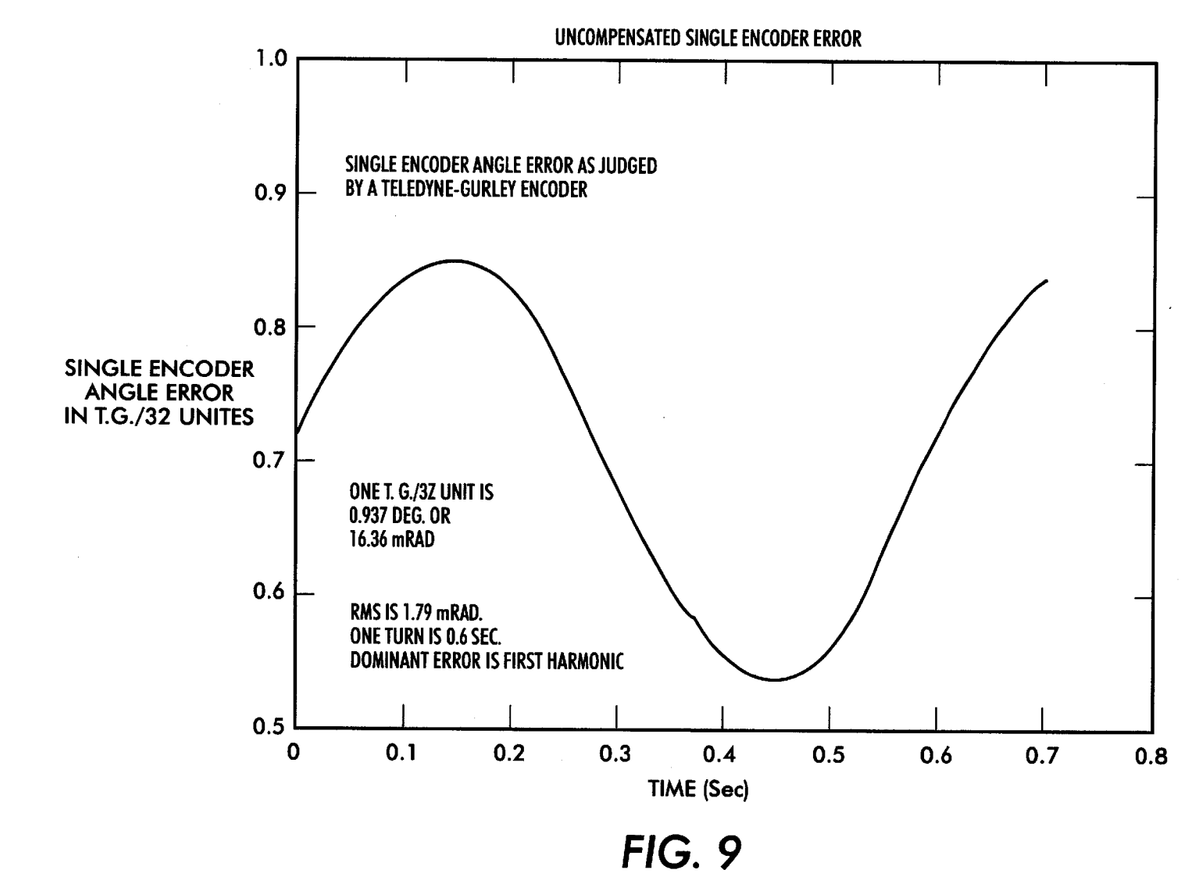
FIG. 9 is a graph showing encoder angle error of a conventional single encoder sensor arrangement as judged by a Teledyne-Gurley encoder.
Figure 10:
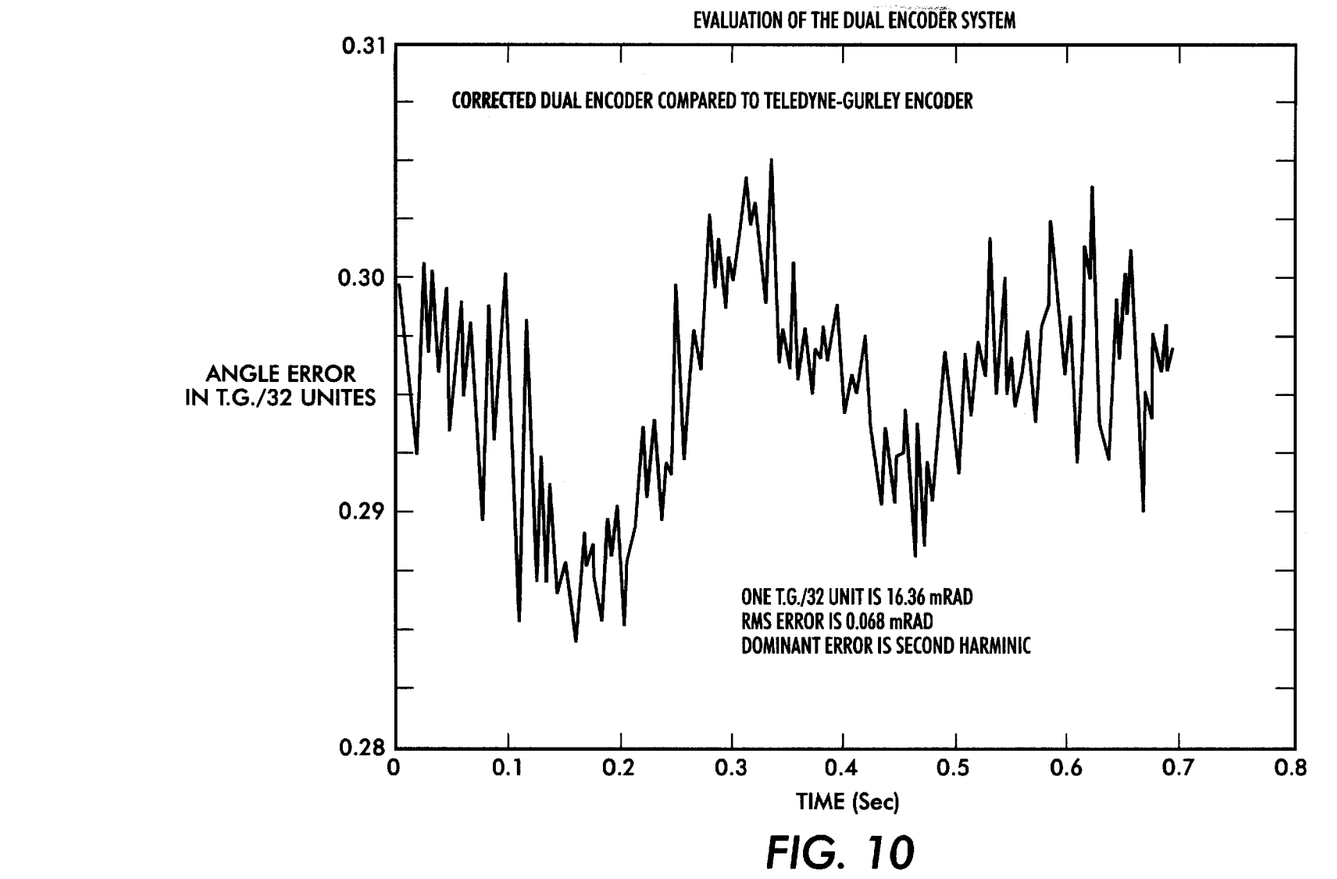
FIG. 10 is a graph showing encoder error of the inventive dual encoder sensor configuration as judged by a Teledyne-Gurley encoder.

A fixture was built and tested to establish the accuracy of such a dual sensor encoder. The fixture consisted of the dual encoder sensors and codewheel mounted on a precise Teledyne-Gurley encoder. A small motor and pulley were used to drive the encoders at an unregulated rate. Timing data was recorded for transitions of the compensated dual encoder signal, the Teledyne-Gurley encoder and one phase of one of the dual encoders. FIGS. 9–10 show the indicated angles of the single and dual encoder sensors relative to the Teledyne-Gurley encoder as a function of rotation time. The time range is just over one rotation of the shaft.

It can be seen that the dominant error with a single encoder sensor is due to the eccentric mounting of the codewheel. The rms error is 1.7 mRad which is much greater than a desired 0.5 mRad allowed runout. Note that runout should be roughly 2.8 times the rms value meaning that a target rms is about 0.18 mRad. Thus, the single encoder sensor fails by nearly a factor of 10. However, the dual encoder sensor rms error is 0.07 mRad, which is 2.5 times better than needed. The residual error is still largely systematic, with most of the error being second harmonics in the shaft rotation. The exemplary embodiments of the systems and methods of this invention remove only the odd harmonics. Even harmonics would require additional sensors at different locations. Each additional sensor is estimated to cost about $20.00 for full quadrature. In theory, only a single channel encoder sensor is needed for correction and a single channel encoder sensor with index for the primary encoder.

Figure 11:
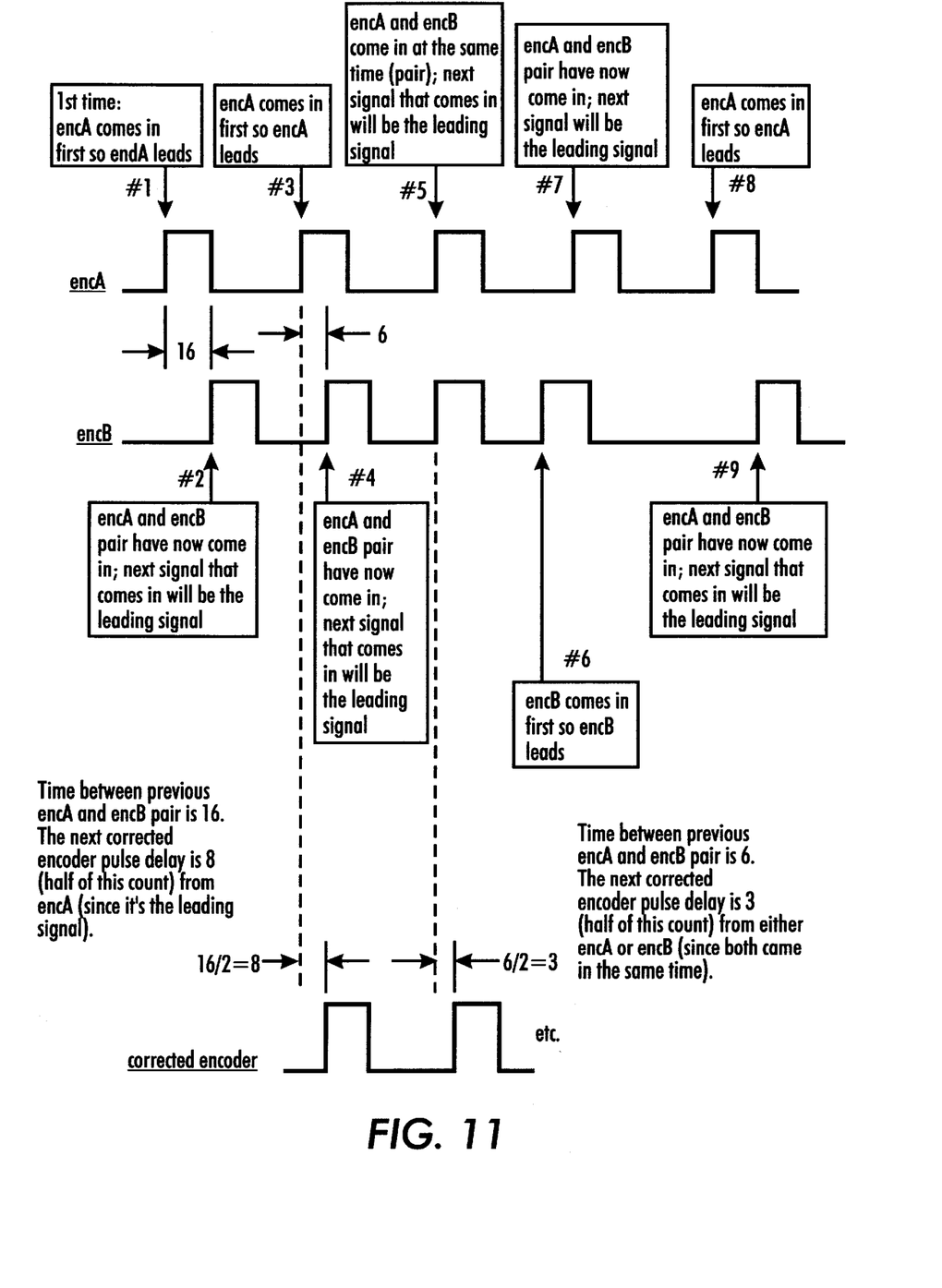
FIG. 11 is a timing chart that determines leading encoder signals to generate a corrected encoder output pulse according to a second exemplary embodiment of the invention.

FIG. 11 shows a second exemplary embodiment of the systems and methods according to this invention. The same codewheel and dual sensor encoder system is used. However, with the first embodiment, it is assumed that the rising edge of the pulse generated by the second encoder sensor 200B will occur after the rising edge of the pulse generated by the first encoder sensor 200A and before the rising edge of the next pulse generated by the first encoder sensor 200A. That is, the rising edge of the pulse generated by the first encoder sensor 200A is assumed to always be leading. However, this assumption may not always be correct if the alignment is substantially off. The second embodiment resolves this problem.

It is possible that the phase relationship between the encoder sensor 200A and the encoder sensor 200B can change, which means that the rising edge of the pulse generated by the second encoder sensor 200B may not always occur after the rising edge of the pulse generated by the first encoder sensor 200A and before the rising edge of a next pulse generated by the first encoder sensor 200A. Taking into consideration the fact that the pulse signals generated by the first and second encoder sensors 200A and 200B can cross each other and assuming that a pair of the pulse signals generated by the first and second encoder sensors 200A and 200B will pass before the next pulse signals generated by the first and second encoders 200A and 200B come, a method can be generalized that generates an encoder sensor signal as follows: the time from the first received signal from the pair (whichever signal comes first of the first and second encoder sensors 200A and 200B) to the second received signal in the pair is counted. Half of this count is then used to time the next encoder pulse delay from the next encoder signal that comes in. This next encoder signal that comes in is considered the leading signal.

It is important to identify which one of the two encoder signals from the encoder sensors 200A and 200B is leading. This comes into play when generating the corrected encoder output signal. The corrected encoder output signal will always be generated a certain distance from the leading signal. Since the two raw encoder sensor signals can cross each other many times, it is necessary to continually use a process to identify which encoder sensor is leading for every pair of encoder sensor signals.

The process to identify the leading edge will now be described. The first time around, the signal that comes in first is determined to be the leading signal. The process then waits until the signal from the other encoder sensor of the pair comes. When the other signal comes in, the process recognizes that an encoder sensor pair have passed. Since a pair has passed, the process establishes that the next signal that comes in is the leading signal, regardless of whether it is from the first or second encoder sensor 200A or 200B. The process then continues to repeat itself as shown in the timing chart of FIG. 11. If the process is waiting for the next signal to come in to establish a leading signal and it just so happens that signals from both the first and second encoder sensors 200A and 200B come in at the same time, then the corrected encoder delay is timed from either as it doesn't matter since both arrived at the same time. The process will then recognize that a pair have passed (both at the same time) and will establish that the next signal will be the leading signal.

Figure 12:
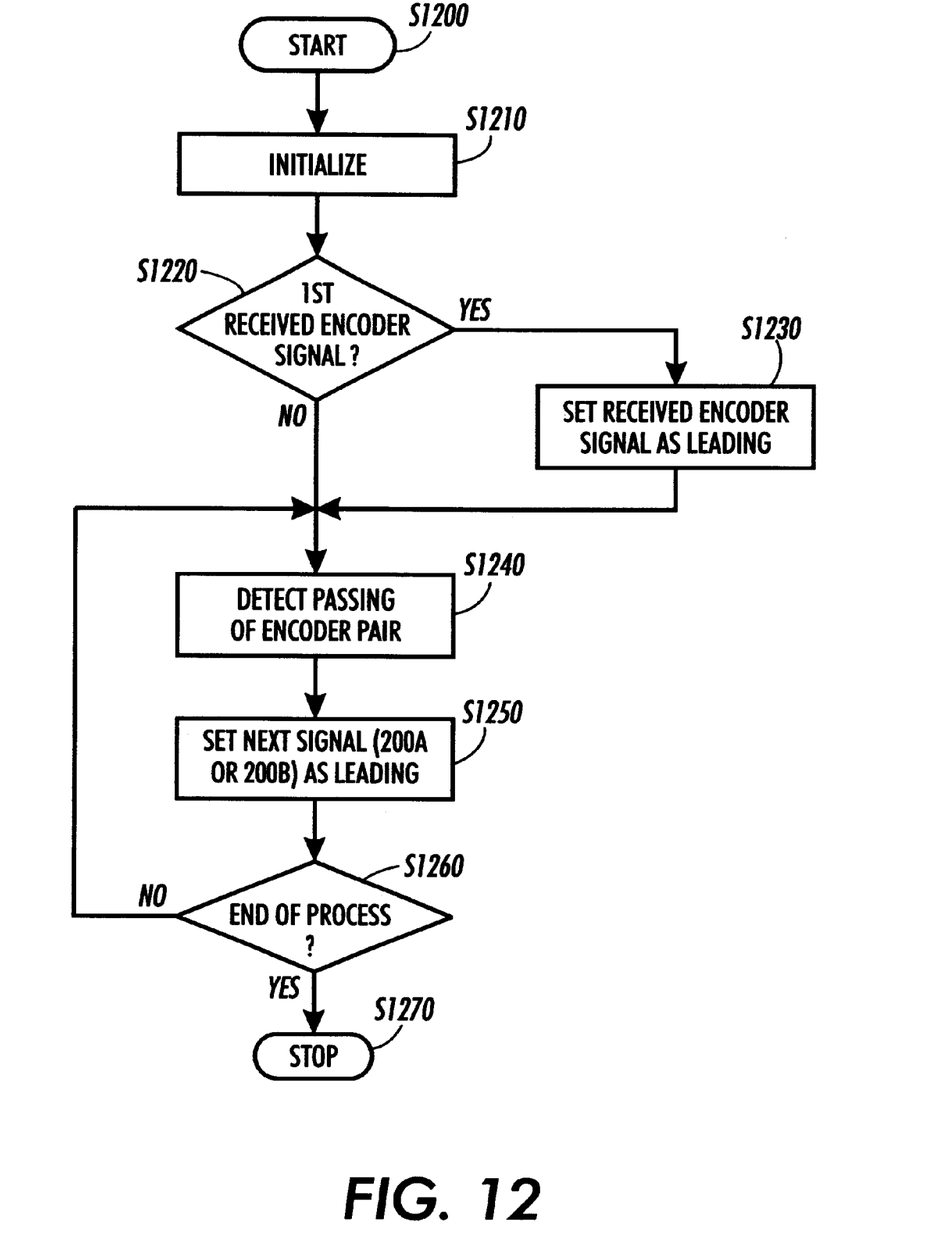
FIG. 12 is a flowchart outlining one exemplary embodiment of a process of identifying a leading encoder signal.

The process described above to achieve the timing illustrated in FIG. 11 is shown in the flow chart of FIG. 12 and can be achieved by implementation on a general purpose computer. However, the process can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PDL, PLA, FPGA or PAL, or the like.

Figure 13:
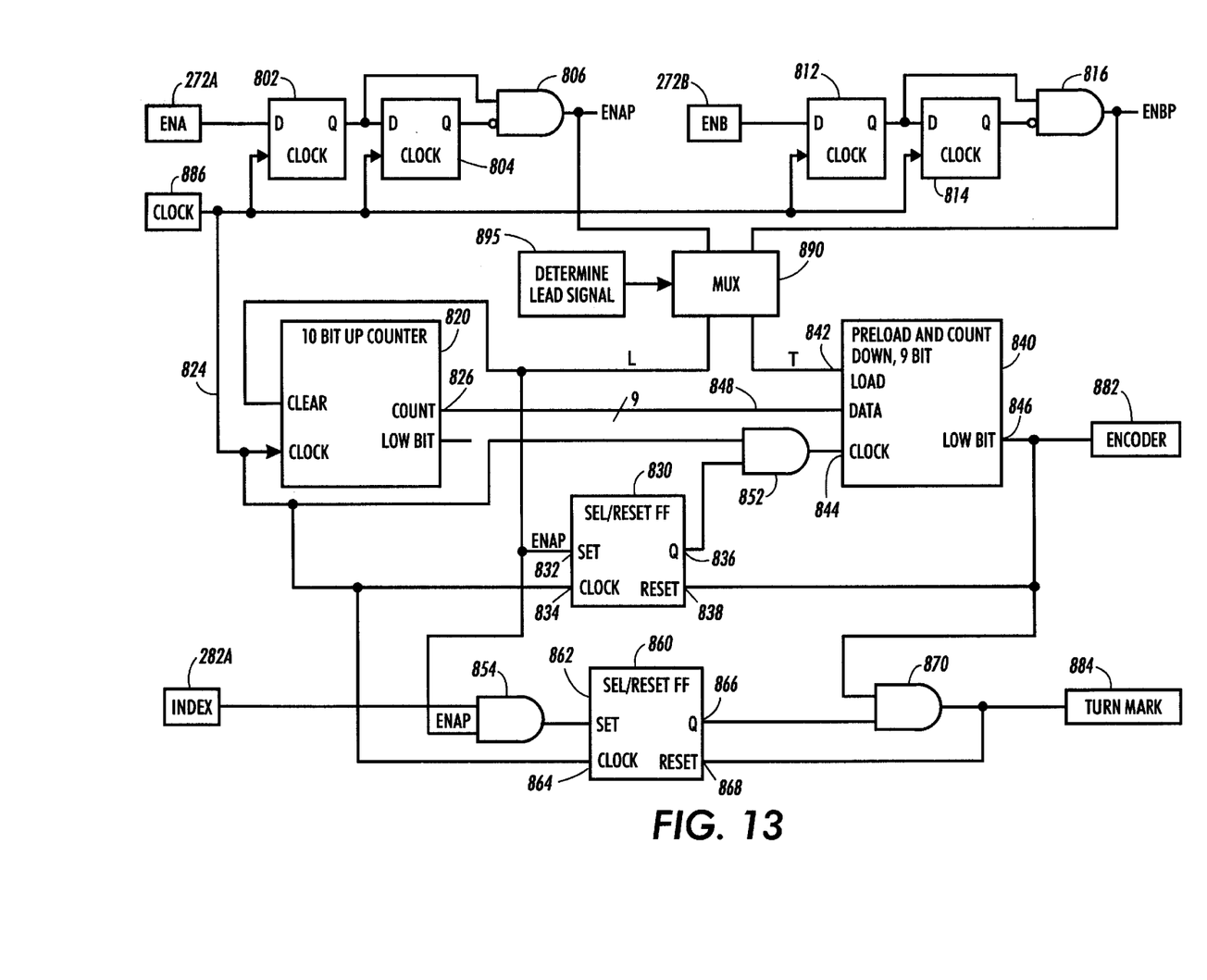
FIG. 13 is a circuit diagram for generating a modified signal according to the second exemplary embodiment of the invention.

FIG. 13 shows an exemplary circuit for achieving the corrected signal according to the exemplary second embodiment of the systems and methods of this invention. It is very similar to the circuit in FIG. 8. However, rather than always assuming that encoder sensor 200A is "leading," both the signals ENAP and ENBP from the encoder sensors 200A and 200B, respectively, are fed to a multiplexer 890. A determination section 895 determines the leading signal from the signals ENAP and ENBP according to the exemplary methodology discussed above with reference to FIGS. 11–12. The determination section 895 causes the multiplexer 890 to output the leading signal L (either ENAP or ENBP) to the up-counter 820 while the trailing signal T (the other of ENAP or ENBP) is output to the down-counter 840.

While the dual sensor encoding system of the invention can be used for any application requiring a low-cost, high precision encoder to determine rotation of a rotating member, it is particularly suited as an encoder system for controlling positioning of a printing drum architecture. In particular, the inventive encoder system can precisely signal rotational alignment signaling of paper transport and image generation subsystems of a multiple head printing system.

Although the invention has been described in detail above with respect to several preferred embodiments, various modifications can be implemented without departing from the spirit and scope of the invention.

What is claimed is:

1. A dual sensor encoder system comprising:
   a codewheel having a periphery;
   a first encoder sensor mounted at a first position about the periphery of the codewheel, the first encoder sensor providing a first output signal;
   a second encoder sensor mounted at a second position about the periphery of the codewheel substantially 180° from the first encoder sensor, the second encoder sensor providing a second output signal; and
   means for digitally synthesizing a correction signal that is approximately half way in time between the first and second signals.

2. The dual sensor encoder system of claim 1, wherein the first encoder sensor and the second encoder sensor each have at least one output channel and at least one of the first encoder and the second encoder further includes an index pulse.

3. The dual sensor encoder system of claim 2, wherein the codewheel includes a hub member and a disc-shaped member extending radially from the hub member, the hub member having an inner diameter of a predetermined size forming a central aperture sized to fit on a rotating shaft of a member to be sensed.

4. The dual sensor encoder system of claim 2, wherein the codewheel has a resolution between 96 and 2048 counts per revolution (CPR).

5. The dual sensor encoder system of claim 2, wherein the means for digitally synthesizing includes a logic clock source with a clock rate of about 768 kHz.

6. The dual sensor encoder system of claim 2, wherein the means for digitally synthesizing includes an up-counter and a down-counter, the up-counter is cleared when a leading edge of the first output signal rises, both the up-counter and the down-counter run after the leading edge of the first output signal rises, half of the value of the up-counter is loaded into the down-counter when a leading edge of the second output signal rises, and a corrected output signal is output upon the expiration of the down-counter.

7. The dual sensor encoder system of claim 6, wherein upon expiration of the down-counter, the down-counter is reset on a next clock signal and holds this value until loaded with the halved value from the up-counter.

8. The dual sensor encoder system of claim 1, wherein a phase from the second encoder is phase locked with a period of a phase of the first encoder for a full rotation of the codewheel.

9. The dual sensor encoder system of claim 1, wherein each of the first and second encoder is mounted to the codewheel approximately 180° from the other and the system further comprises means for determining a correct phase from two available phases at each of the first and second encoders such that the selected phases have the least temporal overlap.

10. The dual sensor encoder system of claim 9, wherein the means for determining includes a microprocessor that samples one phase of the first encoder and each of the two phases of the second encoder during a complete revolution of the codewheel and provides routing signals that pass the correct phase of the second encoder to the means for digitally synthesizing the correction signal.

11. The dual sensor encoder system of claim 1 further comprising means for determining a leading signal from the first output signal and the second output signal.

12. The dual sensor encoder system of claim 10, wherein the means for determining a leading signal sets a first received signal from one of the first output signal and the second output signal as the leading signal, detects the passing of a signal from the other of the first output signal and the second output signal to determine passing of an encoder pair, and sets the next received signal as the leading signal.

13. An image forming device comprising:
an image forming drum having a rotational shaft; and
the dual sensor encoder system of claim 1 with the codewheel mounted to the rotational shaft.

14. A method for reducing eccentric mounting errors of a codewheel mounted to a rotational element by using dual sensor encoder system comprising the steps of:
approximately mounting the codewheel to the rotational element;
mounting a first encoder sensor at a first position about a periphery of the codewheel;
mounting a second encoder sensor at a second position about the periphery of the codewheel approximately 180° from the first position;
generating a first encoder output signal from the first encoder upon rotation of the codewheel;
generating a second encoder output signal from the second encoder upon further rotation of the codewheel; and
providing a corrected output signal that is approximately half way in time between the first and second encoder output signals.

15. The method of claim 14, further comprising the step of determining a correct phase from two available phases at each of the first and second encoders such that the selected phases have the least temporal overlap.

16. The method of claim 14, wherein the step of providing a corrected output signal includes:

providing a correction circuit having the first encoder output signal and the second encoder output signal as inputs, a logic clock signal operating at a predetermined frequency, an up-counter connected to the logic clock signal, a down-counter connected to the up-counter and the logic clock signal, and a corrected signal output;

initializing the up-counter to zero and the down-counter to maximum;

clearing the up-counter when the first encoder output signal rises;

starting the up-counter and the down-counter when the first encoder output signal rises;

halving the value in the up-counter and storing this halved value in the down-counter when the second encoder output signal rises;

starting the down-counter when the first output signal again rises;

generating the corrected output signal upon the down-counter reaching zero; and resetting the down-counter to maximum after reaching zero.

17. The method of claim 16, wherein the correction circuit also includes a index pulse input from one of the first encoder and the second encoder and a corrected index pulse output.

18. The method of claim 16, further comprising the steps of sampling one phase of the first encoder and each of two phases of the second encoder during a complete revolution of the codewheel and provides routing signals that pass the correct phase of the second encoder to the correction circuit.

19. The method of claim 14, further comprising the step of determining a leading signal from the first encoder signal and the second encoder signal.

20. The method of claim 19, wherein the step of determining a leading signal includes:
setting a first received signal from one of the first encoder sensor and the second encoder sensor as the leading signal;
detecting the passing of a signal from the other of the first encoder sensor and the second encoder sensor to determine passing of an encoder pair; and
setting the next received signal as the leading signal.

21. The method of claim 14, wherein the rotational element is a drum of an image forming device and the method further comprises the step of:
controlling timing of the image forming device based on the corrected output signal generated by the dual sensor encoder system.

* * * * *